Dec. 20, 1966   L. HOLLEMAN   3,293,427

HEADLIGHT BLACKOUT ADAPTER

Filed Sept. 14, 1964

INVENTOR.
LEENDERT HOLLEMAN
BY
ATTORNEY

3,293,427
HEADLIGHT BLACKOUT ADAPTER
Leendert Holleman, 5276 Linden Ave.,
Long Beach, Calif. 90805
Filed Sept. 14, 1964, Ser. No. 396,331
2 Claims. (Cl. 240—46.53)

This invention relates to a headlight blackout adapter whereby the direct rays of the headlights of a motor vehicle can be so dimmed or reduced that they will not materially light up the area adjacent to the vehicle. The reason for the dimming or reducing of the light from the headlights of the vehicle would be during war, or for other reasons where it is undesirable to strongly illuminate the area around a motor vehicle.

An object of my invention is to provide a novel blackout adapter which can be readily attached to the front of the headlight lenses of a motor vehicle, and which can also be readily removed when the reason for the blackout is eliminated.

Another object of my invention is to provide a novel blackout adapter which is simple in construction, inexpensive to manufacture, and which will effectively dim or reduce the light emitted by the headlight of a vehicle.

Other objects, advantages and features of invention may appear from the accompanying drawing, the subjoined detailed description and the appended claims.

Figure 1:
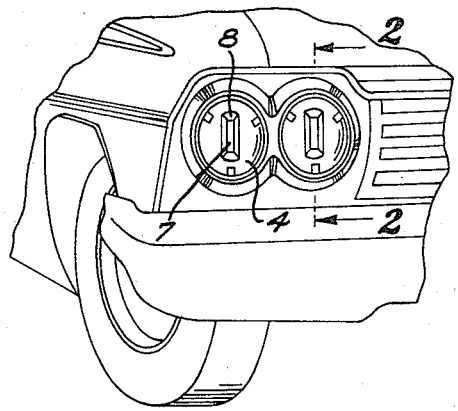
FIGURE 1 is a fragmentary perspective view of the headlights of a motor vehicle with my blackout adapter mounted thereon.
Figure 2:
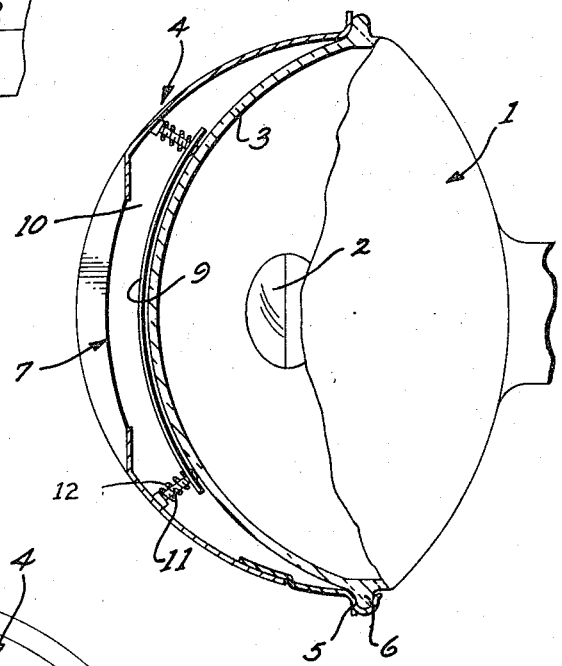
FIGURE 2 is a side elevation of a vehicle headlight with parts broken away to show interior construction.
Figure 3:
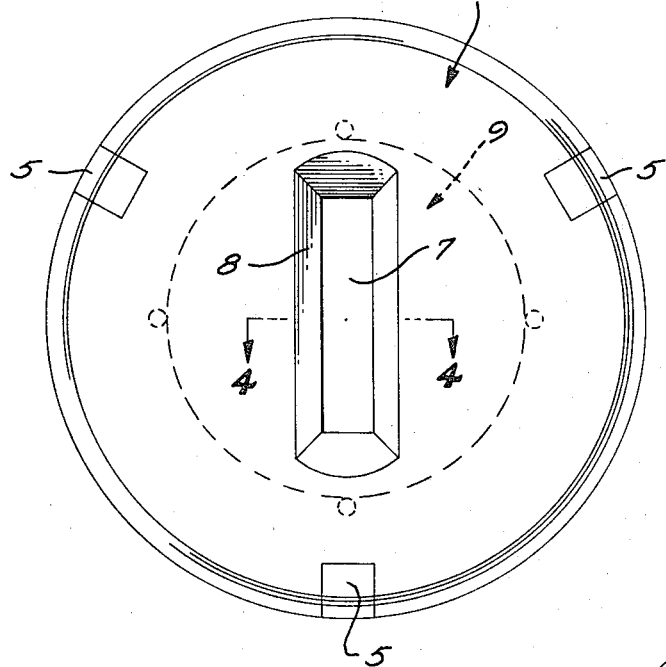
FIGURE 3 is a front elevation of my blackout adapter.
Figure 4:
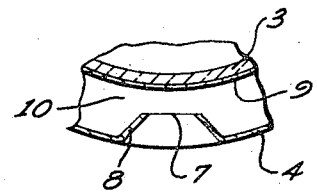
FIGURE 4 is a fragmentary sectional view taken on line 4—4 of FIGURE 3.

Referring more particularly to the drawing, the numeral 1 indicates a vehicle headlight, preferably of the unit construction. The light unit 2 and the front lens 3 consist of a single construction and preferably one sealed unit. My blackout adapter, however, can also be used on those headlights in which the light unit and the lens are separate and distinct parts.

My blackout adapter 4 is preferably formed of a suitable metal and is attached to the front or outer face of the lens 3. The attachment may be by means such as the spring clips 5 which engage the mounting ring 6 on the lens 3. Thus the adapter 4 can be quickly and easily mounted or dismounted from the headlight 1, as might be required. My blackout adapter 4 is formed of a hemispherical shell and a vertical slot 7 is formed therein. The four walls 8 which extend to the slot 7 are tapered or bent inwardly, so that the slot 7 is thus recessed below the outer convex surface of the adapter 4. Immediately behind the slot 7 and spaced inwardly therefrom, I provide a convex or dished plate 9 which bears against the outer face of the lens 3. The plate 9 thus covers the slot 7 as viewed from the front of my adapter. However, an annular space 10 is provided between the plate 9 and the slot 7 so that light can pass around the edge of the plate and thence horizontally until it reaches the slot 7 where the light is emitted. The outer surface of the plate 9 may be coated with a fluorescent material or a reflecting material, so that sufficient light will be emitted from the headlights to permit the driver of the vehicle to see enough of the road surface to permit slow driving.

The plate 9 is preferably attached to the inner face of the adapter 4 by means of suitable screws or the like 11 which extend between these parts and thus secure the plate in position. The screws 11 are surrounded by a coil spring 12 which bears against the plate 9 to spring press the plate against the face of the lens 3. Since the plate 9 bears against the lens 3 it will also assist in tensioning the clips or mounting pieces 5 so that the blackout adapter will be held securely in position.

Having described my invention, I claim:

1. A headlight blackout adapter for a vehicle comprising,
    a semispherical bowl adapter to be positioned in front of a vehicle headlight,
    means on the bowl securing the same to the vehicle headlight, comprising spring clips,
    said bowl having a slot therein,
    the walls of the bowl extending to the slot being tapered inwardly.
    and a plate on the inside of said bowl and positioned opposite said slot and spaced inwardly therefrom, an annular mounting ring on the headlight engaged by the spring clips.

2. A headlight blackout adapter for a vehicle comprising,
    a semispherical bowl adapter to be positioned in front of a vehicle headlight,
    means on the bowl securing the same to the vehicle headlight, comprising spring clips,
    said bowl having a slot therein,
    the walls of the bowl extending to the slot being tapered inwardly,
    and a plate on the inside of said bowl and positioned opposite said slot and spaced inwardly therefrom, said plate bearing against the vehicle headlight, an annular mounting ring on the headlight engaged by the spring clips, and coil springs extending between the plate and bowl to press the plate against the headlight.

References Cited by the Examiner
UNITED STATES PATENTS

| 1,167,078 | 1/1916 | Jones | 240—46.53 |
| 1,268,162 | 6/1918 | Scalbom | 240—46.01 |

FOREIGN PATENTS

| 694,987 | 8/1940 | Germany. |
| 713,011 | 10/1941 | Germany. |

NORTON ANSHER, *Primary Examiner.*

CHARLES R. RHODES, *Assistant Examiner.*